United States Patent
Price et al.

(10) Patent No.: US 7,702,443 B2
(45) Date of Patent: *Apr. 20, 2010

(54) SYSTEM FOR CUSTOMIZING RESPONSIVENESS OF A MACHINE

(75) Inventors: Robert J. Price, Dunlap, IL (US); Bryan D. Brown, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/213,156

(22) Filed: Jun. 16, 2008

(65) Prior Publication Data

US 2008/0255712 A1 Oct. 16, 2008

Related U.S. Application Data

(63) Continuation of application No. 10/927,318, filed on Aug. 27, 2004, now Pat. No. 7,400,959.

(51) Int. Cl.
*G06F 7/70* (2006.01)
(52) U.S. Cl. .......................................... 701/50; 701/36
(58) Field of Classification Search .................... 701/1, 701/24, 25, 36, 33, 50, 70; 172/9–12
See application file for complete search history.

(56) References Cited

U.S. PATENT DOCUMENTS

| 4,375,672 | A | 3/1983 | Kato et al. |
| 4,380,070 | A | 4/1983 | Steiner |
| 4,677,429 | A | 6/1987 | Glotzbach |

(Continued)

FOREIGN PATENT DOCUMENTS

JP 01-184524 7/1989

(Continued)

OTHER PUBLICATIONS

B&B Electronics Manufacturing Company, http://www.bb-elec.com/product.asp?sku=J1708D15, printed May 16, 2001 (1 page).

(Continued)

*Primary Examiner*—Richard M. Camby
(74) *Attorney, Agent, or Firm*—Finnegan, Henderson, Farabow, Garrett & Dunner

(57) ABSTRACT

A control system for customizing a relationship between an operator input at an input controller and a corresponding response of a work machine is disclosed. The control system includes an input controller operable to receive an operator input and generate a corresponding control signal. The control system also includes a hand-held programmable device having parameters stored therein. The parameters are adjustable to control responsiveness of a component of the work machine over a range of inputs at the input controller. The hand-held programmable device is operable to adjust the parameters in response to an input from an operator. A control module is disposed on the work machine and is operable to receive signals from the hand-held programmable device. The signals are representative of a desired relationship between an operator input to the input controller and a corresponding response of the work machine. The control module is also operable to receive the control signal from the input controller and process the control signal based on the signals from the hand-held programmable device.

20 Claims, 5 Drawing Sheets

U.S. PATENT DOCUMENTS

| | | | |
|---|---|---|---|
| 4,685,061 A | 8/1987 | Whitaker | |
| 4,694,408 A | 9/1987 | Zaleski | |
| 4,831,560 A | 5/1989 | Zaleski | |
| 4,924,391 A | 5/1990 | Hirano et al. | |
| 4,926,330 A | 5/1990 | Abe et al. | |
| 4,962,456 A | 10/1990 | Abe et al. | |
| 4,964,049 A | 10/1990 | Abe et al. | |
| 4,967,143 A | 10/1990 | Raviglioine et al. | |
| 4,975,846 A | 12/1990 | Abe et al. | |
| 4,975,847 A | 12/1990 | Abe et al. | |
| 4,975,848 A | 12/1990 | Abe et al. | |
| 4,996,643 A | 2/1991 | Sakamoto et al. | |
| 5,003,476 A | 3/1991 | Abe | |
| 5,003,477 A | 3/1991 | Abe et al. | |
| 5,003,478 A | 3/1991 | Kobayashi et al. | |
| 5,003,479 A | 3/1991 | Kobayashi et al. | |
| 5,005,129 A | 4/1991 | Abe et al. | |
| 5,034,889 A | 7/1991 | Abe | |
| 5,038,289 A | 8/1991 | Abe | |
| 5,050,080 A | 9/1991 | Abe | |
| 5,345,384 A | 9/1994 | Przybyla et al. | |
| 5,400,018 A | 3/1995 | Scholl et al. | |
| 5,408,412 A | 4/1995 | Hogg et al. | |
| 5,541,840 A | 7/1996 | Gume et al. | |
| 5,712,625 A | 1/1998 | Murphy | |
| 5,737,711 A | 4/1998 | Abe | |
| 5,758,300 A | 5/1998 | Abe | |
| 5,790,965 A | 8/1998 | Abe | |
| 5,793,649 A | 8/1998 | Take et al. | |
| 5,841,992 A | 11/1998 | Martin | |
| 5,859,628 A | 1/1999 | Ross et al. | |
| 5,899,947 A | 5/1999 | Hall et al. | |
| 5,916,286 A | 6/1999 | Seashore et al. | |
| 5,935,180 A | 8/1999 | Fieramosca et al. | |
| 6,061,617 A | 5/2000 | Berger et al. | |
| 6,088,636 A | 7/2000 | Chigumira et al. | |
| 6,108,562 A | 8/2000 | Rydbeck et al. | |
| 6,122,575 A | 9/2000 | Schmidt et al. | |
| 6,134,489 A | 10/2000 | Smedley | |
| 6,181,992 B1 | 1/2001 | Gurne et al. | |
| 6,189,057 B1 | 2/2001 | Schwanz et al. | |
| 6,198,996 B1 | 3/2001 | Berstis | |
| 6,342,839 B1 | 1/2002 | Curkendall et al. | |
| 6,346,885 B1 | 2/2002 | Curkendall | |
| 6,356,824 B1 | 3/2002 | Chene et al. | |
| 6,363,304 B1 | 3/2002 | Ramsey | |
| 6,542,789 B2 | 4/2003 | Ufheil | |
| 6,615,123 B2 | 9/2003 | Morehouse | |
| 6,622,083 B1 | 9/2003 | Knockeart et al. | |
| 6,625,503 B1 | 9/2003 | Smith | |
| 6,766,231 B2 | 7/2004 | Nakagawa et al. | |
| 6,917,867 B2 | 7/2005 | Huang et al. | |
| 6,923,285 B1 | 8/2005 | Rossow et al. | |
| 2002/0016829 A1 | 2/2002 | Defosse | |
| 2002/0062185 A1 | 5/2002 | Runge et al. | |
| 2002/0078363 A1 | 6/2002 | Hill et al. | |
| 2003/0069679 A1 | 4/2003 | Keefer et al. | |
| 2003/0078709 A1 | 4/2003 | Yester et al. | |
| 2003/0182033 A1 | 9/2003 | Underdahl et al. | |

FOREIGN PATENT DOCUMENTS

| | | |
|---|---|---|
| JP | 05-048671 | 2/1993 |
| JP | 05-158590 | 6/1993 |
| JP | 08-097863 | 4/1996 |
| JP | 10-290269 | 10/1998 |

OTHER PUBLICATIONS

B&B Electronics Manufacturing Company, http://www.bb-elec.com/product.asp?sku=P1708D15&pathid-489, printed May 16, 2001 (2 pages).

B&B Electronics Manufacturing Company, http://www.bb-elec.com/palm/welcome.asp, printed May 16, 2001 (2 pages).

AutoTap OBDII Scan Tool Updates and New Software Releases, http://www.autotap.com/new.html, printed May 16, 2001 (3 pages).

AutoTap OBDII Scan Tool Selection Guide, http://www.autotap.com/scantoolselectionguide.html, printed May 16, 2001 (3 pages).

SYSTEM FOR CUSTOMIZING RESPONSIVENESS OF A MACHINE

This application is a continuation of Application Ser. No. 10/927,318, filed on Aug. 27, 2004, now U.S. Pat. No. 7,400,959 which is allowed, the content of which is incorporated herein by reference in its entirety.

TECHNICAL FIELD

This disclosure is directed to a system for adjusting work machine parameters. More particularly, this disclosure is directed to a system for customizing a relationship between operator input and a corresponding response of a work machine.

BACKGROUND

Some work machines are designed to perform a variety of different tasks. For example, a backhoe may be used for trenching, truck loading, light craning, and grading and leveling, among others. Each of these different tasks may require different operational attributes or characteristics of the backhoe linkage. For example, when trenching, it may be desirable to move the work implement with a high velocity and high power, while for grading or leveling, it may be advantageous to move the work implement with less velocity and power.

Like the tasks, different operators may prefer different operational attributes for a single joystick movement. For example, skilled operators may prefer high velocity movement of the work implement, while less skilled operators may be more comfortable moving the work implement at a lower velocity.

One system for setting attributes for specific drivers of a vehicle is disclosed in U.S. Pat. No. 6,198,996 to Berstis. The '996 patent discloses a smart card that authorizes a specific user to operate a vehicle. The smart card stores data that may be used to limit certain capabilities of the vehicle, such as, for example, velocity or acceleration. The limitations may be programmed by an authorized user to control and limit the driver's use of the vehicle. However, the system disclosed in the '996 patent does not allow an operator to use a hand-held programmable device to change the relationship between parameters to customize the parameters of a work machine.

This disclosure describes a system and method for allowing an operator to customize parameters of a work machine with a hand-held programmable device, based on his or her own preference.

SUMMARY OF THE INVENTION

In one exemplary aspect, a control system for customizing a relationship between an operator input at an input controller and a corresponding response of a work machine is disclosed. The control system includes an input controller operable to receive an operator input and generate a corresponding control signal. The control system also includes a hand-held programmable device having parameters stored therein. The parameters are adjustable to control responsiveness of a component of the work machine over a range of inputs at the input controller. The hand-held programmable device is operable to adjust the parameters in response to an input from an operator. A control module is disposed on the work machine and is operable to receive signals from the hand-held programmable device. The signals are representative of a desired relationship between an operator input to the input controller and a corresponding response of the work machine. The control module is also operable to receive the control signal from the input controller and process the control signal based on the signals from the hand-held programmable device.

In another exemplary aspect, a method for customizing a relationship between an operator input at an input controller and a corresponding response of a work machine is disclosed. The method includes storing parameters in a hand-held programmable device and adjusting the parameters to control responsiveness of a component of the work machine over a range of inputs at the input controller. The hand-held programmable device is operable to adjust the parameters in response to an input from an operator. A control module receives signals from the hand-held programmable device that are representative of a desired relationship between an operator input to the input controller and a corresponding response of the work machine. A control signal is also received from the input controller. The control signal is processed based on the signals received from the hand-held programmable device.

DETAILED DESCRIPTION

Reference will now be made in detail to exemplary embodiments that are illustrated in the accompanying drawings. Wherever possible, the same reference numbers will be used throughout the drawings to refer to the same or like parts.

Figure 1:
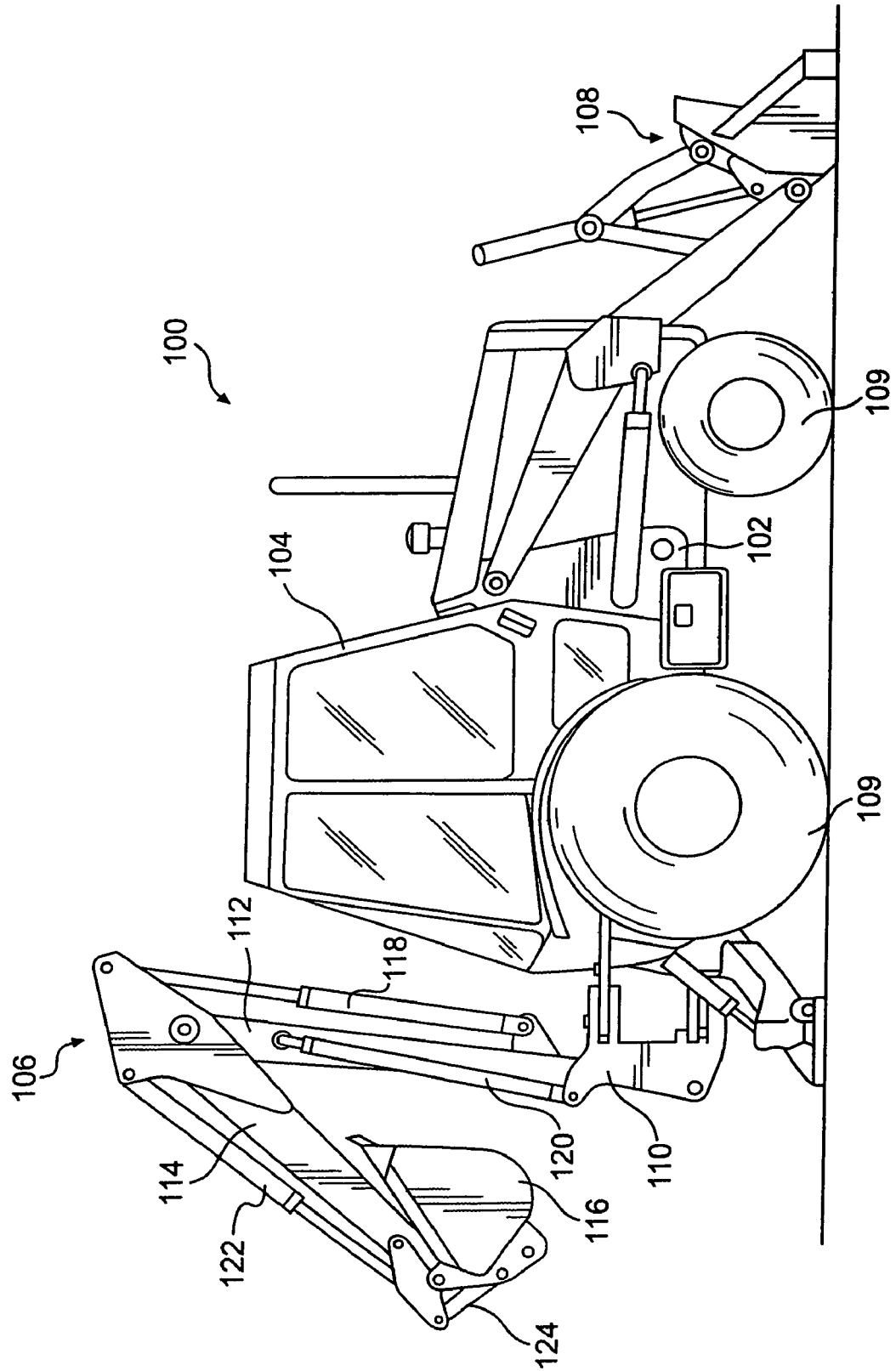
FIG. 1 is a pictorial representation of an exemplary work machine.

An exemplary work machine 100 is shown in FIG. 1 as a backhoe loader. The work machine 100 includes a frame structure 102, an operator's compartment 104, and controllable components including a work linkage 106 and a front work implement 108. In addition, the work machine includes wheels 109 for supporting and driving the work machine 100.

The frame structure 102 supports and carries the operator's cab 104, the work linkage 106, and the front work implement 108. The operator's cab 104 may be enclosed as shown, or may be open. One or more operator controls, such as an operator input controller for receiving an input from a work machine operator and controlling the work machine 100, may be housed in operator's cab 104.

The exemplary work linkage 106 includes a swing frame 110, a boom member 112, a stick member 114, and a work implement 116. The work linkage 106 can be used to, among other things, dig a hole or ditch, level the ground, or grade an area at a desired angle. The work linkage 106 may also include any number of actuators, such as the first, second, and third actuators 118, 120, 122 shown in FIG. 1. A link 124 may connect the third actuator 122 to the work implement 116.

Figure 2:
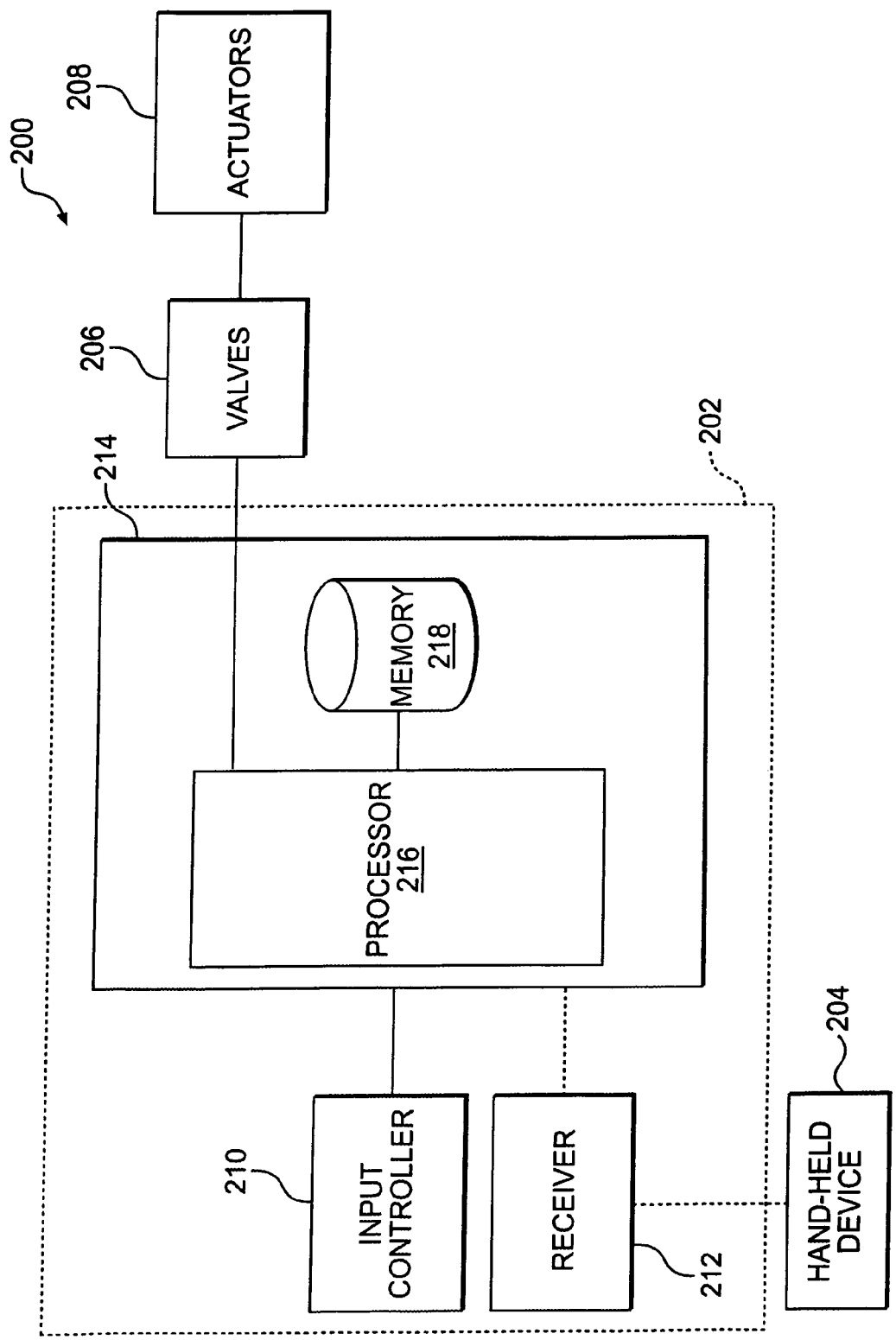
FIG. 2 is a block diagram of an exemplary control system.

FIG. 2 is a block diagram of a control system 200 for customizing parameters and operating the work machine 100. The control system 200 allows an operator to customize a relationship between an operator input at an input controller and a corresponding response of the work machine 100. The customized relationship controls responsiveness of a component of the work machine over a range of inputs at the input controller, such as, for example, from 0% percent input to 100% input. For example, some customizable relationships may include the relationship between movement of an input controller and actuator speed and the relationship between percentage of throttle and ground speed. Other relationships would be apparent to one skilled in the art. The control system 200 includes an interface 202, a communication device, such as a hand-held programmable device 204, and valves 206.

The interface 202 includes an input controller 210, a receiver 212, and a control module 214. The input controller 210 may be disposed in the operator's cab 104 of the work machine 100 and may be configured to receive an input from an operator to control a component of the work machine 100, such as the work linkage 106. In response to movement or manipulation, the input controller 210 may generate and send a control signal to the control module 214 to control the component of the work machine 100. The input controller 210 may be a joystick, a knob, a dial, keyboard or other input device known in the art. When the component is the work linkage 106, the input controller 210 may be used to operate and control movement of the work linkage 106 by controlling actuators 208, which may include one or more of the actuators 118, 120, 122, 124. Accordingly, the input from the operator may be an input to move the work linkage 106 in a desired manner.

The receiver 212 may be configured to interface with and receive a transmitted signal from the programmable device 204 through a direct data port connection or through a wireless transmission, such as RF transmission, an infrared signal, a laser signal, and/or a radio frequency signal, among others. One skilled in the art will recognize that any radiative signal may be used. The receiver 212 is configured to receive the transmission from the programmable device 204, process the transmission, and communicate with the control module 214. Accordingly, the receiver 212 may generate or relay a signal representative of the information received from the programmable device 204. In one exemplary embodiment, the receiver is a docking system for receiving and communicating with the programmable device 204.

The control module 214 may include a processor 216 and a memory 218. The processor 216 could be any standard processor for executing a computer program. Likewise, the memory 218 could be any standard memory component known in the art, and may be configured to store data, such as a computer program and/or routine that may executable by the processor 206. The control module 214 may be configured to receive control signals generated by the input controller 210 to control the work linkage 106. In addition, the control module 214 may be configured to process the control signals and to generate a processed signal that controls the valves 206 in a manner desired by the operator, thereby operating the actuators 208.

The hand-held programmable device 204 may be in selective communication with the interface 202 through the receiver 212. The programmable device 204 may include its own processor and/or memory and may be configured to store data representative of adjustable parameters and/or other information. For example, the programmable device 204 may be configured to store and adjust parameters defining a relationship between velocity of the actuators 208 and movement of the input controller 210. In one exemplary embodiment, the programmable device 204 is configured to transfer or transmit data and/or a computer program to the receiver 212. The receiver 212, in turn, may be configured to transmit the data or program to the processor 216 which may then be stored in the memory 218. A control signal from the input controller 210 may be processed by the processor 216 according to the program or data received from the receiver 212. Accordingly, data from the programmable device 204 may be used to control the processing of the signal from the input controller 210.

Figure 3:
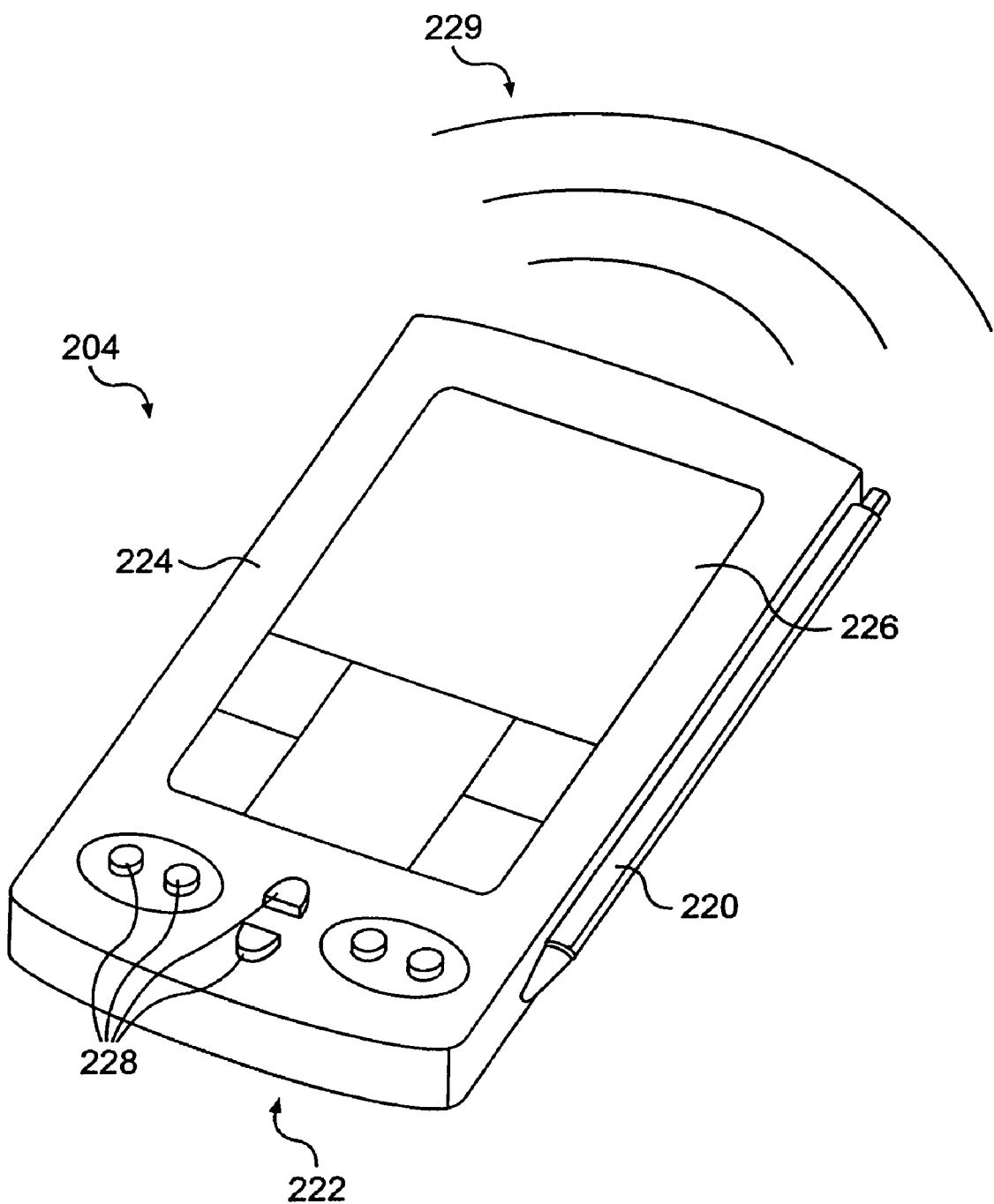
FIG. 3 is a pictorial representation of an exemplary hand-held programmable device.

FIG. 3 shows one exemplary embodiment of a programmable device 204. The programmable device could be a hand-held programmable device such as a personal digital assistant (PDA), such as a Palm Pilot. The programmable device 204 includes a stylus 220 and a body 222. The stylus 220 may be used to enter information into the programmable device 204 in a manner known in the art.

The body 222 includes a housing 224, a display 226, and one or more input mechanisms 228. The housing 224 may be configured in a manner known in the art and may house circuitry and other components of the programmable device 204. The display 226 may be formed in a surface of the housing 224 and may be configured to display icons, information, plots, graphs, and/or other data to an operator. Further, the display 226 may be a touch-type display allowing selection, manipulation, and/or entry of data by touching the display 226, such as with the stylus 220 or other means. The input mechanisms 228 may be buttons, dials, or keys, and/or other input mechanisms enabling a user to manipulate and/or enter data and make selections in the programmable device 204.

The programmable device 204 may be configured to radiate a signal 229 in a manner known in the art to transfer data. The signal 229 may be received at the receiver 212 shown in FIG. 2. Alternatively, the programmable device 204 may include a wire port for direct connection to the receiver 212. The programmable device 204 may communicate using a wire connection or a wireless transmission in a known manner.

Figure 4:
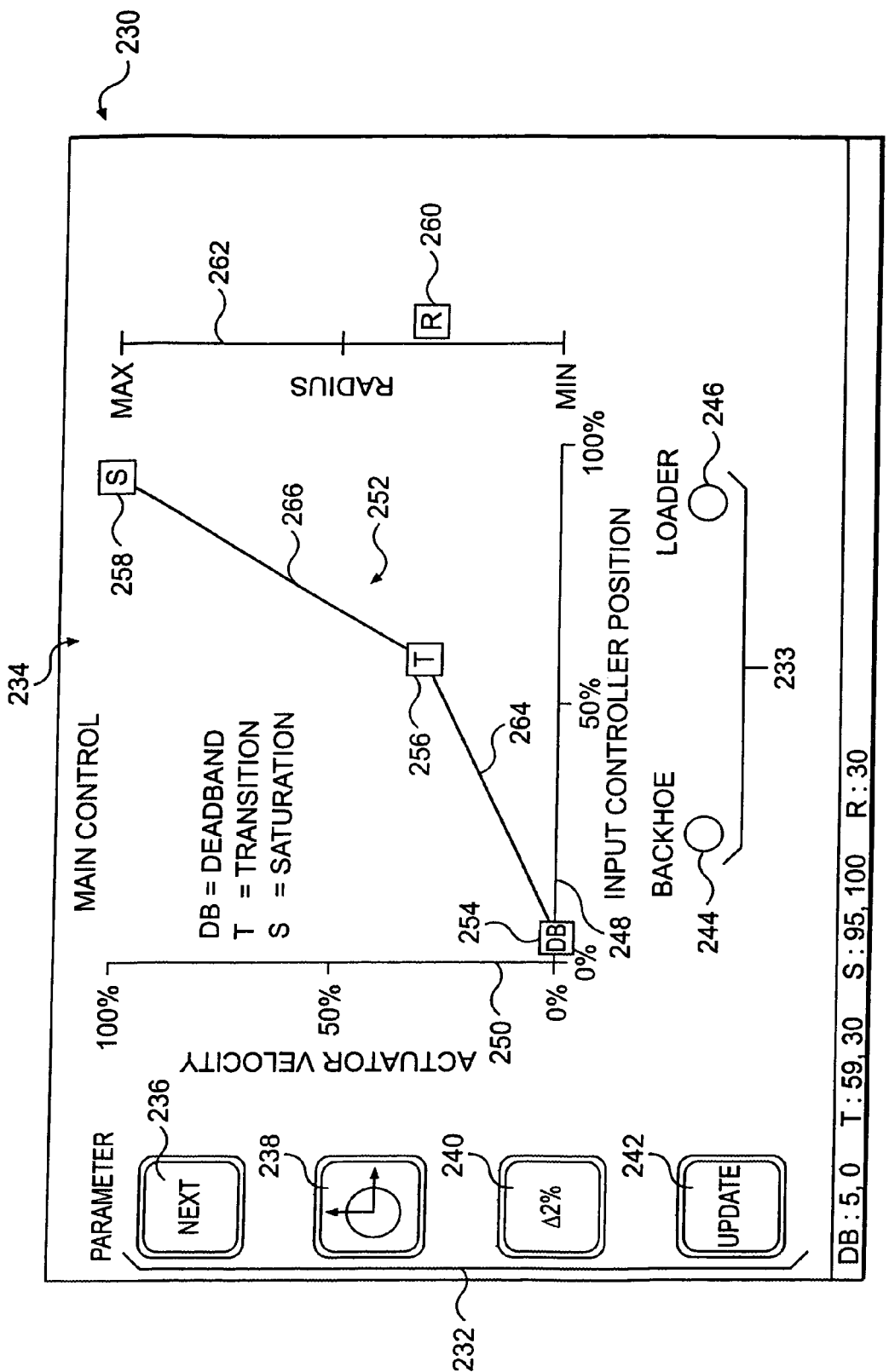
FIG. 4 is a pictorial representation of an exemplary image on a screen of the hand-held programmable device.

FIG. 4 shows one exemplary screen 230 that may be displayed on the display 226. The screen 230 is a graphical controllability interface that allows the operator to customize the controllability characteristics of the work machine by interacting with the programmable device 204. The operator may customize the characteristics by adjusting the parameters to control a relationship defined by responsiveness of a component of the work machine over a range of inputs from the input controller 210. The screen 230 includes selectable parameter button icons 232, selectable work implement selection icons 233, and a velocity modulation map 234, defining a relationship between position of the input controller 210 and velocity of at least one of actuator, such as the actuator 208. The button icons 232 allow an operator to navigate within the screen 230, and include a next button 236, a direction button 238, a shift button 240, and an update button 242. The next button 236 may be selected to change a cursor from one selectable parameter to another. The direction button 238 may be selected to control the direction of movement of any parameter on the screen 230. The shift button 240 may be a shortcut button that changes the value of the selectable parameters by a given percentage in the direction selected using the direction button 238. For example, the shift button 240 in the exemplary screen shows that a selected parameter may be shifted two percent when the shift button is selected. The update button 242 may store any changes to the velocity modulation map 234. After the update button 242 is selected, the velocity modulation map 234 may then be transferred to the interface 202 on the work machine 100, as explained above.

The selectable work implement selection icons 233 may be used to identify the work implement 116 to be used on the work machine 100. A different velocity modulation map 234 may be stored within the programmable device 204 for each work implement. FIG. 4 shows a backhoe icon 244 and a loader icon 246. The programmable device 204 may be configured so that selection of one of these icons automatically retrieves a velocity modulation map 234 for that work implement. Accordingly, an operator may customize the parameters for each individual work implement. Any number of additional work implement selection icons may be used.

In addition, for each task the work machine 100 may perform, the programmable device 204 may store a different velocity modulation map 234. The map 234 for the task may be accessible for customization to define the relationship between an input from the input controller 210 and the work machine response. For example, the programmable device 204 may include a separate velocity modulation map 234 for the tasks of trenching and grading. Each map may be customized by the operator to reflect his preferences.

The velocity modulation map 234 displays the relationship between movement of the input controller 210 and actuator velocity and includes a horizontal axis 248, a vertical axis 250, a velocity modulation curve 252, and selectable parameters including a dead band icon 254, a transition point icon 256, a saturation point icon 258, and a radius icon 260 adjustable along a radius axis 262. The horizontal axis 248 represents a position of the input controller 210 as controlled by an operator. The vertical axis 250 represents the actuator velocity that corresponds to a position of the input controller 210.

The parameters, including the dead band icon 254, the transition point icon 256, and the saturation point icon 258, define the location of points on the velocity modulation curve 252. As used in FIG. 4, the deadband is the percentage of travel the input controller 210 must move in order to initiate actuator movement. The transition is the point at which the slope of the velocity modulation curve changes, splitting the curve into a work slope 264 and a production slope 266. The saturation point is the position of the input controller 210 where the maximum velocity of an actuator is obtained. The radius represents the radius of a circle tangent to both the work and production slopes 264, 266 to smoothly transition from one slope to another, as described below.

The programmable device 204 is configured so that an operator may adjust the positions of the dead band icon 254, the transition point icon 256, the saturation icon 258, and the radius icon 260 to move them to a desired location on the screen 230, thereby customizing the velocity modulation curve 252. In one exemplary embodiment, the dead band icon 254 may be moveable only along the horizontal axis 248. The saturation point icon 258 may be moveable horizontally and/or vertically along the map 234 to control the relationship between a maximum velocity and the input controller position. The transition point icon 256 may be moveable to any location within the map 234. The radius icon 254 may be adjustable along the radius axis 260 from a minimum radius to a maximum radius.

By changing any of the single function parameters, the operator is able to shape the velocity modulation curve 252 and define the relationship between input controller position and actuator velocity. The operator may adjust these parameters on the display 226 using the stylus 220 and/or the input mechanisms 228. In one exemplary embodiment, the parameters are adjusted by dragging the icons to a desired location on the map 234 using the stylus or selection of the shift button 240.

Figure 5:
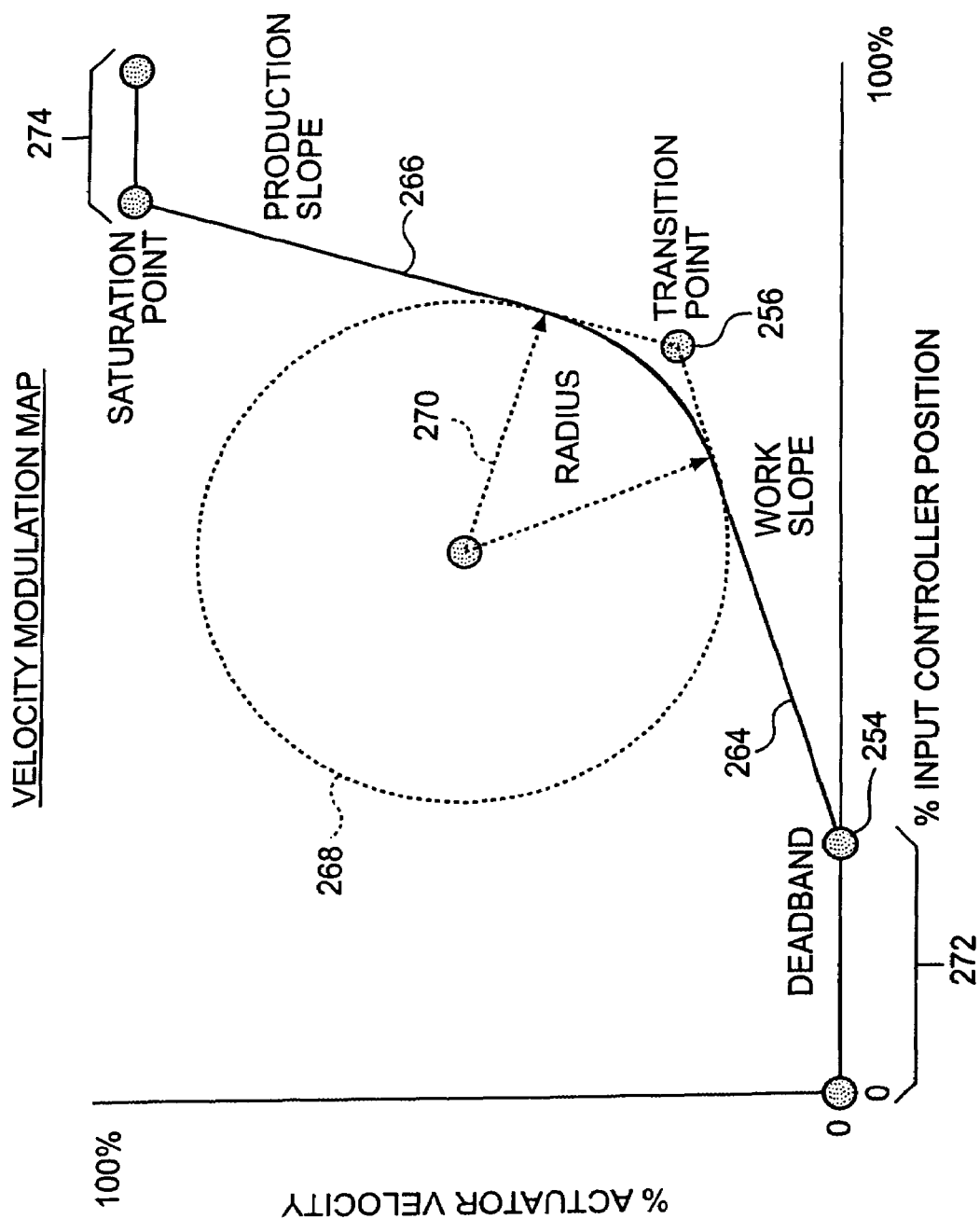
FIG. 5 is another pictorial representation of an exemplary image on a screen on the hand-held programmable device.

The velocity modulation map 234 is shown in more detail in FIG. 5, including a circle 268 having a radius 270 that may be adjusted using the radius icon 260 on the velocity modulation map 234, in FIG. 4. As seen in FIG. 5, a dead band region 272, where movement of the input controller 210 by a certain percentage will generate zero velocity of the work implement 216, extends from a 0% position to about a 25% position. From the deadband region 272, the velocity modulation curve 252 slopes toward the transition point defined by the transition point icon 256 along the work slope 264 and then toward the saturation point, defined by the saturation point icon 258, creating a saturation region 274. The work slope 264 may be a controllability characteristic on the map 234 including a high amount of manipulation of the input controller 210 to generate a small amount of velocity, while the production slope 266 may be configured to be just the opposite, in that a small change in the input controller 210 position results in a large change in the percent velocity. It should be noted that, in this embodiment, only one transition point is shown. However, additional transition points may be used to manipulate and adjust the controllability characteristics of the work machine 100. The saturation region 274 is a region where additional movement of the input controller 210 cannot result in increased velocity because the velocity is already at 100%.

The radius icon 260 may be adjusted from a minimum to a maximum along the radius axis 262 in FIG. 4. The radius affects the curve 252 by defining the radius 270 of the curve connecting the production slope 266 and work slope 264 adjacent the transition point shown in FIG. 5. Accordingly, the curve 252 may be created by solving for a circle 268 which is tangent to both the work slope 264 and the production slope 266 based on an input radius 270, allowing the curve 252 to smoothly transition from the work slope 264 to the production slope 266. It should be noted that parabolic or cubic curves may be used instead of a circle to smoothly transition between the work slope 264 and the production slope 266. Other curves, including higher order curves may also be used.

The programmable device 204 may be configured to allow the operator to customize the parameters in different levels of complexity. For example, in one embodiment, a separate velocity modulation map 234 is stored for each individual actuator on the work linkage 106. At one level, the programmable device 204 may be configured to allow simultaneous adjustment of all the velocity modulation maps 234 for the actuators by adjusting a single velocity modulation curve 252. Therefore, by adjusting the adjustable parameters, changes to a single velocity modulation map 234 are applied to all actuator velocity modulation maps. This allows the operator to globally change the maps for all implements using a single screen 230. At a second level, the programmable device 204 allows an operator to change the velocity modulation map 234 for a single, individual actuator. For example, the operator may choose to change the velocity modulation curve 252 for the actuator for the boom member 112. In yet another level, an operator to change the velocity modulation map for a single actuator or group of actuators depending on the direction of actuator movement. For example, this level may allow an operator to have a velocity modulation map for extension of a cylinder and a different modulation map for retraction of the same cylinder.

It should be noted that in some exemplary embodiments, the parameters may have a pre-established relationship so that movement of one parameter correspondingly adjusts one or more additional parameters. Accordingly, the parameters need not be individually adjusted, but may be adjusted as a group. For example, movement of the dead band icon 254 may also move the transition point so that the work slope 264 stays constant. Other relationships could be used as would be apparent to one skilled in the art.

INDUSTRIAL APPLICABILITY

The control system 200 described herein allows an operator to customize the parameters of a work machine 100. Using the hand-held programmable device 204, the operator can adjust the parameters, and then control the work machine 100 using those parameters. The parameters may be those used in response to a given input to operate a component on the work machine 100, such as the work linkage 106. In one embodiment, the adjustable parameters allow customization of the relationship between movement of the input controller 210 and actuator velocity. Therefore, the operator may control the responsiveness of the work linkage 106 to the input from the input controller 210.

A method for operating the work machine 100 using the control system 200 will now be described. An operator may desire to adjust the controllability of the work machine 100. Accordingly, using a hand-held programmable device 204, he may access stored, adjustable parameters that control the relationship defined by responsiveness of a component of the work machine over a range of inputs from an input controller. In one example, the relationship is between the input controller movement and the velocity of actuators on a work implement 106. Using the stylus 220, selectable icon buttons, and/or the input mechanisms 228, the operator may adjust the location of a point on a velocity modulation curve 252. For example, the operator may adjust the deadband icon 254, transition point icon 256, saturation point icon 258, and/or the radius icon 260 on the display 226 of the programmable device 204.

When the operator has adjusted the velocity modulation curve 252 to a desired setting, he may store the new setting by selecting the update icon 242 on the screen 230. Once the update icon 232 is selected, the setting may be stored indefinitely, but may also be retrieved or changed as desired. Signals representative of the updated settings may be sent to the work machine 100 through the receiver 212 of the interface 202. The updated settings may be then sent to the control module 214. It should be noted that the operator may be able to adjust the velocity modulation curve 252 while the programmable device 204 is connected to the work machine 100 through the receiver 212, and in one embodiment, the work machine 100 is operable only when the programmable device 204 is in communication with the work machine 100.

Using the input controller 210 in the operator's cab 204, the operator may create a control signal that is sent to the control module 214 representative of a desired movement of the work linkage 206. The control module 214 may receive the control signal from the input controller 210, and process the signal according to the updated settings received from the programmable device 204. The control module 214 may output a processed signal to the valves 206 to operate the actuators on the work linkage 106 in the manner desired by the operator and in the manner preset on the programmable device 204. Because of this, the operator may customize the parameters for a given work machine 100 by manipulating the parameters on a programmable device 204.

In one example, the operator selects a velocity modulation map for a specific work implement, such as for the work linkage 106. In another exemplary embodiment, the operator selects a velocity modulation map based upon the task to be performed. The operator may customize the specific work implement map and/or the task map to a preferred setting to control the relationship defined by the parameters.

In one exemplary aspect, each operator of a work machine is provided with a personal hand-held programmable device for individual customization of the velocity modulation maps 234. Because the programmable device is hand-held, it need be associated with the receiver 212 and/or the work machine 100 to allow adjustment of the velocity modulation map. Accordingly, an operator may adjust or customize the maps at his own convenience. In another exemplary embodiment, the programmable device 204 may also function as a key to the work machine 100. In this embodiment, the work machine 100 may be configured so that it is inoperable unless the programmable device 204 sends the parameters to the work machine 100. Accordingly, when one operator operates the work machine 100 after a prior operator, he may be required to transfer data from his respective programmable device 204 to the work machine 100 before the work machine 100 can be powered.

It should be noted that while the exemplary work machine 100 is shown as a backhoe loader, other types of work machines may utilize the control system 200 disclosed herein. In addition, the operator may be able to customize parameters for tools and components other than the work linkage 106 and the front work implement 108 shown.

It will be apparent to those skilled in the art that various modifications and variations can be made in the disclosed embodiments without departing from the scope of the invention. Other embodiments of the invention will be apparent to those skilled in the art from consideration of the specification and practice of the invention disclosed herein. It is intended that the specification and examples be considered as exemplary only, with a true scope of the invention being indicated by the following claims and their equivalents.

What is claimed is:

1. A control system for customizing a relationship between an operator input at an input controller and a corresponding response of a machine, comprising:
    an input controller operable to receive an operator input and generate a corresponding control signal;
    a programmable device having parameters stored therein, the parameters being adjustable to control responsiveness of a component of the machine over a range of inputs at the input controller, the programmable device being operable to adjust the parameters in response to an input from an operator; and
    a control module disposed on the machine, the control module being operable to receive signals from the programmable device, the signals being representative of a desired relationship between an operator input to the input controller and a corresponding response of the machine, wherein the control module is further operable to receive the control. signal from the input controller and process the control signal based on the signals from the programmable device.

2. The control system of claim 1, wherein the parameters define a relationship between velocity of an actuator and movement of the input controller.

3. The control system of claim 2, wherein the programmable device is operable to store different relationships between velocity of an actuator and movement of an input controller for more than one implement.

4. The control system of claim 1, wherein the parameters include at least one of a deadband point, a saturation point, a radius, and a transition point.

5. The control system of claim 1, wherein the programmable device includes a display operable to display a modulation map showing the parameters.

6. The control system of claim 1, wherein the programmable device allows selection of an implement, the parameters being based on at least one of the implement type and the task to be performed.

7. The control system of claim 1, including a receiver operable to receive the signals from the programmable device and transmit data representing the signals to the control module.

8. The control system of claim 7, wherein the programmable device is operable to transmit the signals to the receiver by wireless transmission.

9. The control system of claim 1, wherein the programmable device is operable to simultaneously adjust the parameters controlling the relationship between the operator input at the input controller and a corresponding response of more than one component of the machine.

10. The control system of claim 1, wherein the control module is operable only when in communication with the programmable device.

11. The control system of claim 1, wherein the programmable device is remotely controlled.

12. A method for customizing a relationship between an operator input at an input controller and a corresponding response of a machine, comprising:
storing parameters in a programmable device;
adjusting the parameters to control responsiveness of a component of the machine over a range of inputs at the input controller, the programmable device being operable to adjust the parameters in response to an input from an operator;
receiving signals from the programmable device at a control module, the signals being representative of a desired relationship between an operator input to the input controller and a corresponding response of the machine;
receiving a control signal from the input controller; and
processing the control signal based on the signals received from the programmable device.

13. The method of claim 12, wherein adjusting the parameters adjusts a relationship between velocity of an actuator and movement of the input controller.

14. The method of claim 13, including storing a different relationship between velocity of an actuator and movement of an input controller for more than one implement.

15. The method of claim 12, wherein adjusting the parameters includes adjusting at least one of a deadband point, a saturation point, a radius, and a transition point.

16. The method of claim 12, including displaying a modulation map on the programmable device, the modulation map showing the parameters.

17. The method of claim 12, including receiving the signals from the programmable device at a receiver; and
transmitting the signals as data to the control module.

18. The method of claim 12, wherein adjusting the parameters includes simultaneously adjusting the relationship between the operator input at the input controller and a corresponding response of more than one component of the machine.

19. A machine comprising:
an input controller operable to receive an operator input and generate a corresponding control signal;
a programmable device having parameters stored therein, the parameters being adjustable to control a relationship between velocity of an actuator and movement of the input controller, the programmable device being operable to adjust the parameters in response to an input from an operator;
a receiver operable to receive signals from the programmable device representative of the relationship; and
a control module disposed on the machine, the control module being operable to receive data representing the signals from the receiver, wherein the control module is operable to receive the control signal from the input controller and process the control signal based on the signals from the programmable device.

20. The machine of claim 19, wherein the programmable device is operable to store a relationship between velocity of an actuator and movement of the input controller for more than one implement, wherein the relationships for at least two of the implements is different.

* * * * *